(12) United States Patent
Voss (10) Patent No.: US 10,870,461 B2
(45) Date of Patent: Dec. 22, 2020

(54) VEHICLE COMPONENT (71) Applicant: Darrell W. Voss, Vancouver, WA (US)

(72) Inventor: Darrell W. Voss, Vancouver, WA (US)

(*) Notice: Subject to any disclaimer, the term of this patent is extended or adjusted under 35 U.S.C. 154(b) by 0 days.

(21) Appl. No.: 15/468,094

(22) Filed: Mar. 23, 2017

(65) Prior Publication Data
US 2018/0273131 A1 Sep. 27, 2018

(51) Int. Cl.
B62K 21/02 (2006.01)
B62K 19/16 (2006.01)
B62K 19/06 (2006.01)
B62K 25/28 (2006.01)
B62K 21/04 (2006.01)

(52) U.S. Cl.
CPC ............ B62K 21/02 (2013.01); B62K 19/06 (2013.01); B62K 19/16 (2013.01); B62K 25/28 (2013.01); B62K 21/04 (2013.01)

(58) Field of Classification Search
CPC .................. B62K 21/02; B62K 21/04
See application file for complete search history.

(56) References Cited

U.S. PATENT DOCUMENTS

| | | |
|---|---|---|
| 4,596,302 A | 6/1986 | Suzuki et al. |
| 4,821,833 A | 4/1989 | Yamaguchi |
| 5,000,470 A | 3/1991 | Kamler et al. |
| 5,207,619 A | 5/1993 | Klein et al. |
| 5,284,354 A | 2/1994 | McWethy |
| 5,360,088 A | 11/1994 | Voss |
| 5,364,115 A | 11/1994 | Klein et al. |
| 5,377,734 A | 1/1995 | Klein et al. |
| 5,405,159 A | 4/1995 | Klein et al. |
| 5,433,465 A | 7/1995 | Klein et al. |
| 5,452,911 A | 9/1995 | Klein et al. |
| 5,470,091 A | 11/1995 | Voss et al. |
| 5,499,864 A | 3/1996 | Klein et al. |
| 5,509,679 A | 4/1996 | Leitner |
| 5,517,878 A | 5/1996 | Klein et al. |
| 5,557,982 A | 9/1996 | Voss et al. |

(Continued)

FOREIGN PATENT DOCUMENTS

| | | |
|---|---|---|
| CN | 201030927 | 3/2008 |
| FI | 20150329 A | 5/2017 |

(Continued)

OTHER PUBLICATIONS

Cunningham, Richard, First Ride: Promising New Suspension Design From an Unlikely Source, Feb. 23, 2018, Retrieved from https://www.pinkbike.com/news/first-ride-promising-new-suspension-design-from-an-unlikely-source.html, and https://www.pinkbike.com/u/RichardCunningham/album/Damon-Madsen/ on Feb. 26, 2018.

(Continued)

Primary Examiner — Ruth Ilan
Assistant Examiner — Marlon A Arce
(74) Attorney, Agent, or Firm — Young's Patent Services, LLC; Bruce A Young (57) ABSTRACT A vehicle component, comprising a first arm, a second arm, and a yoke portion that connects the first arm and the second arm, wherein at least one of the first arm, the second arm and the yoke portion comprises a tubular structure and an interior wall that divides the tubular structure into a first tubular chamber and a second tubular chamber.

19 Claims, 3 Drawing Sheets

(56) References Cited

U.S. PATENT DOCUMENTS

| | | | |
|---|---|---|---|
| 5,586,780 A | 12/1996 | Klein et al. | |
| 5,611,557 A | 3/1997 | Farris et al. | |
| 5,626,355 A | 5/1997 | Voss et al. | |
| 5,678,837 A | 10/1997 | Leitner | |
| 5,692,764 A | 12/1997 | Klein et al. | |
| 5,743,547 A | 4/1998 | Voss et al. | |
| 5,762,352 A * | 6/1998 | Lee | B62K 19/16 280/280 |
| 5,791,674 A | 8/1998 | D'Aluisio et al. | |
| 5,826,899 A | 10/1998 | Klein et al. | |
| 5,906,385 A | 5/1999 | Voss | |
| 5,944,932 A | 8/1999 | Klein et al. | |
| 5,988,741 A | 11/1999 | Voss et al. | |
| 6,032,971 A | 3/2000 | Herder | |
| 6,109,636 A | 8/2000 | Klein et al. | |
| 6,170,845 B1 | 1/2001 | Tseng | |
| 6,233,790 B1 * | 5/2001 | Carothers | B01D 29/21 24/16 PB |
| 6,361,059 B1 | 3/2002 | Ellsworth | |
| 6,503,589 B1 * | 1/2003 | Fritschen | B62K 3/10 280/281.1 |
| 6,609,722 B1 * | 8/2003 | Miyoshi | B62K 21/04 280/280 |
| RE38,669 E | 12/2004 | Voss et al. | |
| 6,848,700 B1 * | 2/2005 | Fritschen | B62K 19/16 280/281.1 |
| 7,048,292 B2 | 5/2006 | Weagle | |
| 7,100,930 B2 | 9/2006 | Saiki | |
| 7,128,329 B2 | 10/2006 | Weagle | |
| 7,143,912 B2 * | 12/2006 | Caneba | A45C 13/262 224/153 |
| 7,147,238 B2 * | 12/2006 | Oi | B62J 6/18 280/281.1 |
| 7,350,787 B2 | 4/2008 | Voss | |
| 7,395,892 B2 | 7/2008 | Alonzo | |
| 7,494,146 B2 | 2/2009 | Tseng | |
| 7,556,276 B1 | 7/2009 | Dunlap | |
| 7,566,066 B2 | 7/2009 | Chang et al. | |
| 7,722,072 B2 | 5/2010 | Hoogendoorn | |
| 7,828,314 B2 | 11/2010 | Weagle | |
| 7,837,213 B2 | 11/2010 | Colegrove et al. | |
| 8,272,658 B2 | 9/2012 | Hoogendoorn | |
| 8,382,136 B2 | 2/2013 | Beale et al. | |
| 8,622,411 B1 | 1/2014 | Chamberlain | |
| 9,039,026 B2 | 5/2015 | Hudec | |
| 9,242,693 B2 | 1/2016 | Voss | |
| 9,969,455 B2 * | 5/2018 | Kwag | B62K 19/30 |
| 2002/0180166 A1 | 12/2002 | Voss | |
| 2003/0011167 A1 | 1/2003 | Turner | |
| 2003/0192992 A1 * | 10/2003 | Olsen | B64C 1/22 244/137.1 |
| 2004/0095776 A1 * | 5/2004 | Pisula | B62J 6/00 362/473 |
| 2004/0219079 A1 * | 11/2004 | Hagen | F01K 21/047 422/607 |
| 2004/0250503 A1 * | 12/2004 | Bigelow | B64G 1/22 52/838 |
| 2005/0056313 A1 * | 3/2005 | Hagen | B01F 5/0453 137/3 |
| 2006/0063624 A1 | 3/2006 | Voss | |
| 2006/0064223 A1 | 3/2006 | Voss | |
| 2007/0063476 A1 * | 3/2007 | Yu | B62K 19/16 280/279 |
| 2007/0286696 A1 * | 12/2007 | Hackenmueller | B60P 3/073 410/8 |
| 2008/0035431 A1 * | 2/2008 | Vroomen | B62K 19/38 188/24.21 |
| 2008/0238030 A1 | 10/2008 | Tseng | |
| 2008/0272560 A1 | 11/2008 | Voss | |
| 2009/0160156 A1 * | 6/2009 | Yu | B62K 19/16 280/276 |
| 2010/0122835 A1 * | 5/2010 | Doi | B60R 16/0215 174/135 |
| 2011/0057415 A1 * | 3/2011 | Kurzka | B60P 3/125 280/402 |
| 2011/0115192 A1 * | 5/2011 | Helms | B62K 3/02 280/281.1 |
| 2011/0233892 A1 | 9/2011 | Domahidy | |
| 2012/0126506 A1 | 5/2012 | Zawistowski | |
| 2012/0261904 A1 * | 10/2012 | Arends | B60D 1/065 280/477 |
| 2013/0020782 A1 | 1/2013 | Hoogendoorn | |
| 2014/0216183 A1 * | 8/2014 | Nakayama | F16C 35/02 74/29 |
| 2014/0265208 A1 | 9/2014 | Voss | |
| 2014/0265227 A1 | 9/2014 | Voss | |
| 2015/0291244 A1 * | 10/2015 | Hsu | B62K 19/16 280/281.1 |
| 2016/0031521 A1 | 2/2016 | Voss | |
| 2016/0083042 A1 | 3/2016 | Voss | |
| 2016/0368559 A1 | 12/2016 | Voss | |
| 2017/0009806 A1 * | 1/2017 | Ikeda | F16C 29/02 |
| 2018/0297628 A1 * | 10/2018 | Bando | B62D 3/12 |

FOREIGN PATENT DOCUMENTS

| | | |
|---|---|---|
| FR | 2898578 A1 | 9/2007 |
| GB | 228382 A | 2/1925 |
| WO | 1995029838 A1 | 11/1995 |
| WO | 2001058748 A1 | 8/2001 |
| WO | 2012024697 | 3/2012 |
| WO | 2014152035 A3 | 12/2014 |
| WO | 2015134538 A1 | 9/2015 |

OTHER PUBLICATIONS

Cunningham, Richard, Polygon Square One EX9 and its R3ACT Suspension—Where it Came From and How it Works, Apr. 12, 2017, Retrieved from https://www.pinkbike.com/news/polygon-square-one-ex9-and-its-r3act-suspension-where-it-came-from-and-how-it-works-2017.html on Feb. 26, 2018.

David Arthur, Suspension stems are back pt2! ShockStop hits Kickstarter target with pivoting suspension stem, Road.CC, Sep. 10, 2015, Farrelly Atkinson Ltd., Bath, United Kingdom, Accessed on the Internet at: http://road.cc/content/news/163688-suspension-stems-are-back-pt2-shockstop-hits-kickstarter-target-pivoting on Aug. 29, 2016.

Rohde, Drew, Elevating More than Chainstays, Mar. 2017, Retrieved from http://www.bluetoad.com/publication/?=380382&ver=html5 &p=90# on May 4, 2017.

Newman, Adam, Exclusive: Dirt Rag test rides new prototype from Chris Currie and Speedgoat Cycles, Dirtrag, Apr. 15, 2015, Retrieved from http://dirtragmag.com/exclusive-dirt-rag-test-rides-new-prototype-from-chris-currie-and-speedgoat-cycles/ on Mar. 4, 2018.

Matt Brett, Suspension stems are back!, Road.CC, Dec. 3, 2014, Farrelly Atkinson Ltd., Bath, United Kingdom, Accessed on the Internet at: http://road.cc/content/news/164555-naild-launches-r3act-suspension-stem-60mm-travel on Aug. 29, 2016.

KIPO, International Search Report for PCT/US2018/023462, dated Jul. 6, 2018.

KIPO, Written Opinion of the International Search Authority for PCT/US2018/023462, dated Jul. 6, 2018.

\* cited by examiner

VEHICLE COMPONENT

BACKGROUND OF THE DISCLOSURE

Field of the Disclosure

The present disclosure relates to a vehicle component.

Description of the Related Art

A large variety of vehicle components are known. The present disclosure expounds upon this background.

SUMMARY OF THE PRESENT DISCLOSURE

The present disclosure relates, inter alia, to a vehicle component, comprising a first arm, a second arm, and a yoke portion that connects the first arm and the second arm, wherein at least one of the first arm, the second arm and the yoke portion comprises a tubular structure and an interior wall that divides the tubular structure into a first tubular chamber and a second tubular chamber, Other objects, advantages and embodiments of the present disclosure will become apparent from the detailed description below.

DETAILED DESCRIPTION

The present disclosure relates to a vehicle component. The vehicle component may constitute a portion of a vehicle frame. The vehicle component may be a front fork or a rear fork, e.g. a front/rear fork of a bicycle, e-bike or motorcycle.

The vehicle component may be a(n individual) component that transfers (at least part of) a gravitational force acting on a payload of a vehicle to at least one (propulsive) element that interacts with an ambient environment of the vehicle, e.g. for the sake of providing a propulsive force and/or for the sake of allowing the vehicle to glide/roll over an ambient surface. The payload may include a driver, a rider and/or a passenger of the vehicle. The payload may include an inanimate payload. The ambient surface may be terrain. Similarly, the ambient surface may be a water surface, e.g. a surface of a body of water. The (propulsive) element may be a terrain-engaging element, e.g. a terrain-engaging element selected from the group consisting of a wheel, a skid, a ski and a (continuous) track. Similarly, the (propulsive) element may be a marine (propulsion) element, e.g. an element selected from the group consisting of a float, a hull, a water ski, a jet nozzle and a propeller. For the sake of conciseness, the term "terrain-engaging element" will be used hereinafter to designate any (propulsive) element as described hereinabove, regardless of whether such element is a marine element. (An elucidation of the term "any" is given in the closing paragraphs of this specification.) The vehicle may be a vehicle selected from the group consisting of a bicycle, an e-bike, a motorcycle, a moped, a (terrestrial) rover, a snowmobile, a snow scooter and a (personal) watercraft. As such, the vehicle may be a vehicle selected from the group consisting of a human-powered vehicle, a (gasoline and/or electric) motor-powered vehicle and a vehicle powered by both human and (gasoline and/or electric) motor power. In the context of the present disclosure, the term "e-bike" may be understood as a bicycle comprising an electrically powered motor that contributes a driving force to at least one wheel of the bicycle.

The vehicle component may comprise at least one (aluminum and/or carbon fiber) structure. At least 80%, at least 90% or (substantially) an entirety of the vehicle component (by volume and/or by weight) may be carbon fiber material. At least 80%, at least 90% or (substantially) an entirety of the vehicle component (by volume and/or by weight) may be aluminum. For example, an entirety of the vehicle component may be of such a material except bushings and/or thread elements, e.g. for interconnecting the vehicle component with other structures of a vehicle. Such bushings and/or thread elements may demand wear characteristics and/or machining tolerances not achievable with aluminum or carbon fiber.

The vehicle component may comprise/consist of at least one tubular structure. The tubular structure may have a longitudinal axis (that extends through a lumen of the tubular structure). The longitudinal axis may spaced from a wall forming the tubular structure by at least 10% of a maximum diameter of the tubular structure. A minimum distance from a wall forming the tubular structure to the longitudinal axis may be at least 10% of a maximum diameter of the tubular structure. The vehicle component may comprise an interior wall. The interior wall may be (substantially) planar. At least 60%, at least 70%, at least 80% or at least 90% of an area (of a major surface) of the interior wall may be planar. The longitudinal axis of the tubular structure may lie in the plane of the planar portion of the interior wall. The interior wall may (longitudinally) divide (at least a portion of) the tubular structure into a first tubular chamber and s second tubular chamber. The tubular structure may have a maximum diameter of less than 5 cm, less than 10 cm, less than 15 cm or less than 20 cm. The tubular structure may have a (minimum) length, e.g. as measured parallel to the longitudinal axis, of at least 15 cm, at least 25 cm or at least 50 cm. The tubular structure may have a (maximum) length, e.g. as measured parallel to the longitudinal axis, of no more than 100 cm, no more than 80 cm or no more than 50 cm. Any of the first tubular chamber, the second tubular chamber and the interior wall may have a (minimum) length, e.g. as measured parallel to the longitudinal axis of the tubular structure, of at least 10%, at least 20%, at least 40%, at least 60%, at least 80% or at least 90% of a (minimum) length of the tubular structure, e.g. as measured parallel to the longitudinal axis of the tubular structure. At least 80%, at least 90% or (substantially) an entirety of the tubular structure (by volume and/or by weight) may be carbon fiber material. At least 80%, at least 90% or (substantially) an entirety of the tubular structure (by volume and/or by weight) may be aluminum. At least 80%, at least 90% or (substantially) an entirety of the interior wall (by volume and/or by weight) may be carbon fiber material. At least 80%, at least 90% or (substantially) an entirety of the interior wall (by volume and/or by weight) may be aluminum. The tubular structure may be a tubular structure selected from the group consisting of a seat tube, a top tube and a down tube of a bicycle. The tubular structure may be an arm of a fork, e.g. a front/rear fork of a bicycle, e-bike or motorcycle. The tubular structure may be a yoke portion of a fork, e.g. a front/rear fork of a bicycle, e-bike or motorcycle The vehicle component may comprise/consist (substantially) of a first arm, a second arm and a yoke portion. Any of the first arm, the second arm and the yoke portion may be a tubular structure as described supra and may comprise an interior wall as described supra. Each of the first and second arms may comprise/define a receptacle, e.g. a dropout, opening or bore, (in a rearmost/lowermost 10% of the respective arm) that receives a (respective) end of an axle (of a wheel). A "rearmost"/"lowermost" region of the first/second arm may be understood as a region most distal from the yoke portion. The yoke portion may interconnect the first and second arms (at a (respective) forward/upper portion of each of the first and second arms). The fork may comprise a space between the first and second arms that accommodates a (forward/upper) portion of the wheel (as known in the art). The fork may be a monolithic/unitary structure. The fork may be termed a "swingarm".

The yoke portion may comprise a cylindrical receptacle. The cylindrical receptacle may constitute a barrel of a slide link. Similarly, the yoke portion may form a piston of the slide link. The slide link may comprise a barrel and a piston (that slides at least partially within the barrel). The barrel may comprise a (circular) cylindrical inner wall. The piston may slide within the barrel along a (linear) slide axis. The piston may comprise a (circular) cylindrical outer wall, e.g. a cylindrical outer wall that (within tolerances as known in the art) matches (the dimensions of) the cylindrical inner wall of the barrel. The cylindrical outer wall of the piston may have a length of at least 10%, at least 20% or at least 30% of a length of the cylindrical inner wall of the barrel. The cylindrical outer wall of the piston may have a length of at most 40%, at most 30% or at most 20% of a length of the cylindrical inner wall of the barrel. The cylindrical outer wall of the piston may have a length of at least 5 cm or of at least 10 cm. The cylindrical outer wall of the piston may have a length of at most 10 cm or at most 20 cm. The length of the cylindrical outer wall of the piston and/or cylindrical inner wall of the barrel may be measured parallel to the slide axis. The cylindrical inner wall of the barrel may have a minimum dimension of at least 5 cm, at least 8 or at least 10 cm, e.g. as measured perpendicular to the slide axis (at the respective location). The cylindrical inner wall of the barrel may have a maximum dimension of at most 15 cm, at most 12 cm or at most 10 cm, e.g. as measured perpendicular to the slide axis (at the respective location). At least 80%, at least 90% or (substantially) an entirety of the slide link (by volume and/or by weight) may be a material selected from the group consisting of steel, aluminum and carbon fiber. Similarly, at least 80%, at least 90% or (substantially) an entirety of the barrel (by volume and/or by weight) may be a material selected from the group consisting of steel, aluminum and carbon fiber and at least 80%, at least 90% or (substantially) an entirety of the piston (by volume and/or by weight) may be a material selected from the group consisting of steel, aluminum and carbon fiber.

The yoke portion may be asymmetric relative to a (first) plane orthogonal to the second rotational axis (and midway between the receptacles of the first and second arms). As touched upon supra, the barrel/piston may comprise a circular cylindrical inner/outer wall. An axis of symmetry of the barrel/piston may be parallel to the (aforementioned first) plane. The axis of symmetry of the barrel/piston may be offset by at least 5 mm, at least 10 mm, at least 15 mm or at least 20 mm from the (aforementioned first) plane (in a direction away from the drivetrain). The vehicle component may constitute a chain stay, e.g. together with the remainder (e.g. barrel/piston) of the slide link not formed by the yoke portion. A chain stay may be understood as an element that supports a driving axis (e.g. a bottom bracket) relative to a driven axis (e.g. the axle axis), i.e. prevents the driven axis from being (unduly/catastrophically) pulled toward the driving axis as a result of a drivetrain force (e.g. the tension of a driven chain or belt). The chain stay may be an elevated chain stay. An elevated chain stay may be understood as a chain stay having a portion located higher (e.g. more distant from the terrain) than a drivetrain/chain of the vehicle. The chain stay may have the overall general shape of an arch and may comprise a central/elevated region. A bottom surface of (the central/elevated region of) the chain stay may be located at least 2 cm, at least 4 cm or at least 6 cm higher than the drivetrain. The central/elevated region may have a length of at least 10 cm, at least 15 cm or at least 20 cm. A forward/upper portion of the (respective) first/second arm may constitute the (respective) central/elevated region. An acute angle between the axis of symmetry of the barrel/piston and a longitudinal axis of the central region may be in the range of 30° to 60°. Similarly, an acute angle between the axis of symmetry of the barrel/piston and (a major surface of) the bottom surface of the central region may be in the range of 30° to 60°. The yoke portion may have a length of at least 10 cm, at least 15 cm or at least 20 cm, e.g. as measured in a direction parallel to at least one of a slide axis of the slide link and an axis of symmetry of the barrel.

The yoke portion may comprise at least one, at least two or at least four interior wall(s) that extends from an outer wall of the yoke portion to a wall forming the barrel. Any of the interior walls of the yoke portion may (longitudinally) divide a tubular (outer wall) structure of the yoke portion into a first tubular chamber and a second tubular chamber (e.g. as described supra). An angle between a respective major surface of any adjacent walls may be (substantially) equal to 360° divided by the total number of such walls (provided at a given cross-section (through the barrel and) orthogonal to at least one of a slide axis of the slide link and an axis of symmetry of the barrel). Any of the interior walls may have a (minimum) length, e.g. as measured parallel to a slide axis of the slide element or an axis of symmetry of the barrel, of at least 50% or at least 80% of a length of the barrel, e.g. as measured parallel to a slide axis of the slide element or an axis of symmetry of the barrel.

A first inner wall of the first arm that faces the second arm may comprise a first bulging region. Similarly, a second inner wall of the second arm that faces the first arm may comprise a second bulging region. The first bulging portion may protrude further in a direction of the second arm than an intermediate region of the first inner wall intermediate the bulging region and the yoke portion. The second bulging portion may protrude further in a direction of the first arm than an intermediate region of the second inner wall intermediate the bulging region and the yoke portion. The protruding of the first/second bulging portion may be in a direction orthogonal to the aforementioned (first) plane. The bulging region may protrude at least 4 mm, at least 6 mm or at least 8 mm further than the (respective) intermediate region. The bulging region may constitute at least 5%, at least 10%, at least 15% or at least 20% of an area of the (respective) inner wall. The bulging region may have a (generally) V-shaped cross-section in a plane orthogonal to a straight line from the axle axis to the yoke portion and orthogonal to the (aforementioned first) plane (through an apex of the bulging region). Similarly, the bulging region may have a (generally) V-shaped cross-section in a plane parallel to a straight line from the axle axis to the yoke portion and orthogonal to the (aforementioned first) plane (through an apex of the bulging region).

At least one of the first and second arm may comprise an interior wall that extends from an outer wall of the respective arm that faces away from the other arm to the (respective) first/second inner wall. The interior wall may (longitudinally) divide the respective first/second arm into a first tubular chamber and a second tubular chamber (e.g. as described supra). The interior wall may be substantially perpendicular to the outer wall. The interior wall may intersect the respective first/second inner wall at the apex of the (respective) first/second bulging region. The interior wall may extend over at least 60%, at least 80% or an entirety of a length of the bulging region, e.g. as measured in a longitudinal direction of the first/second arm and/or parallel to the interior wall. The apex of the bulging region may be located in a rearward/lower half or rearward/lower third of the central region. The bulging region may extend beyond the central region in a direction of the receptacles.

At least one of the first and second arm may comprise an opening that perforates the (respective) inner wall (of the first/second arm). The opening may have a diameter of no more than 6 mm, no more than 8 mm, no more than 10 mm or no more than 12 mm. At least one of the first and second arm may comprise a (tubular) cable guide, e.g. for a brake cable or a shift cable. A lumen of the cable guide may perforate the (respective) inner wall (of the first/second arm) at the opening. The opening may be located in a (most rearward/lowermost) third of the vehicle component (most proximate to the receptacles.

Figure 1:
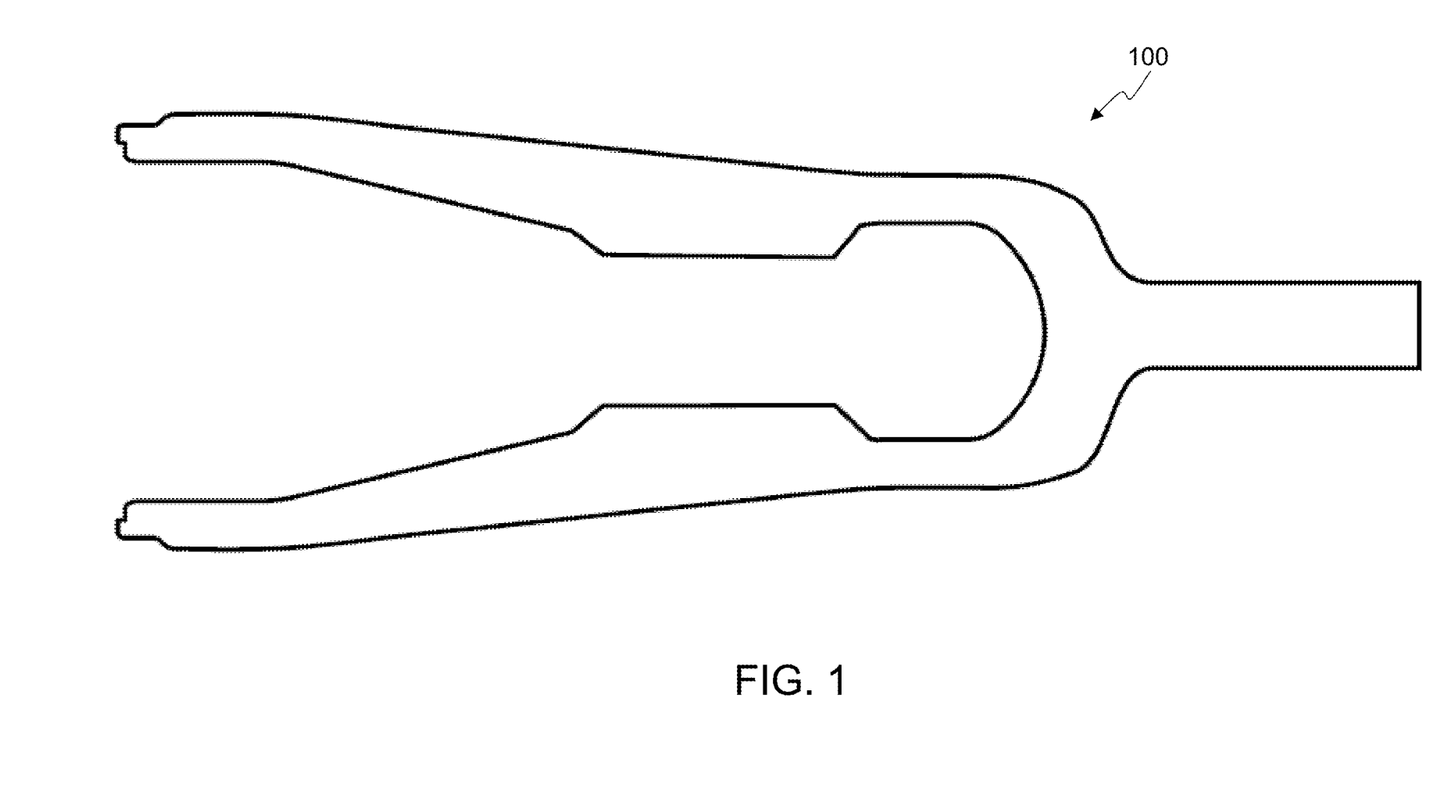
FIG. 1 a first embodiment of a vehicle component in accordance with the present disclosure.

FIG. 1 shows first embodiment of a vehicle component in accordance with the present disclosure. In the depicted embodiment, the vehicle component is a front fork 100 for a bicycle.

Figures 2, 2A:
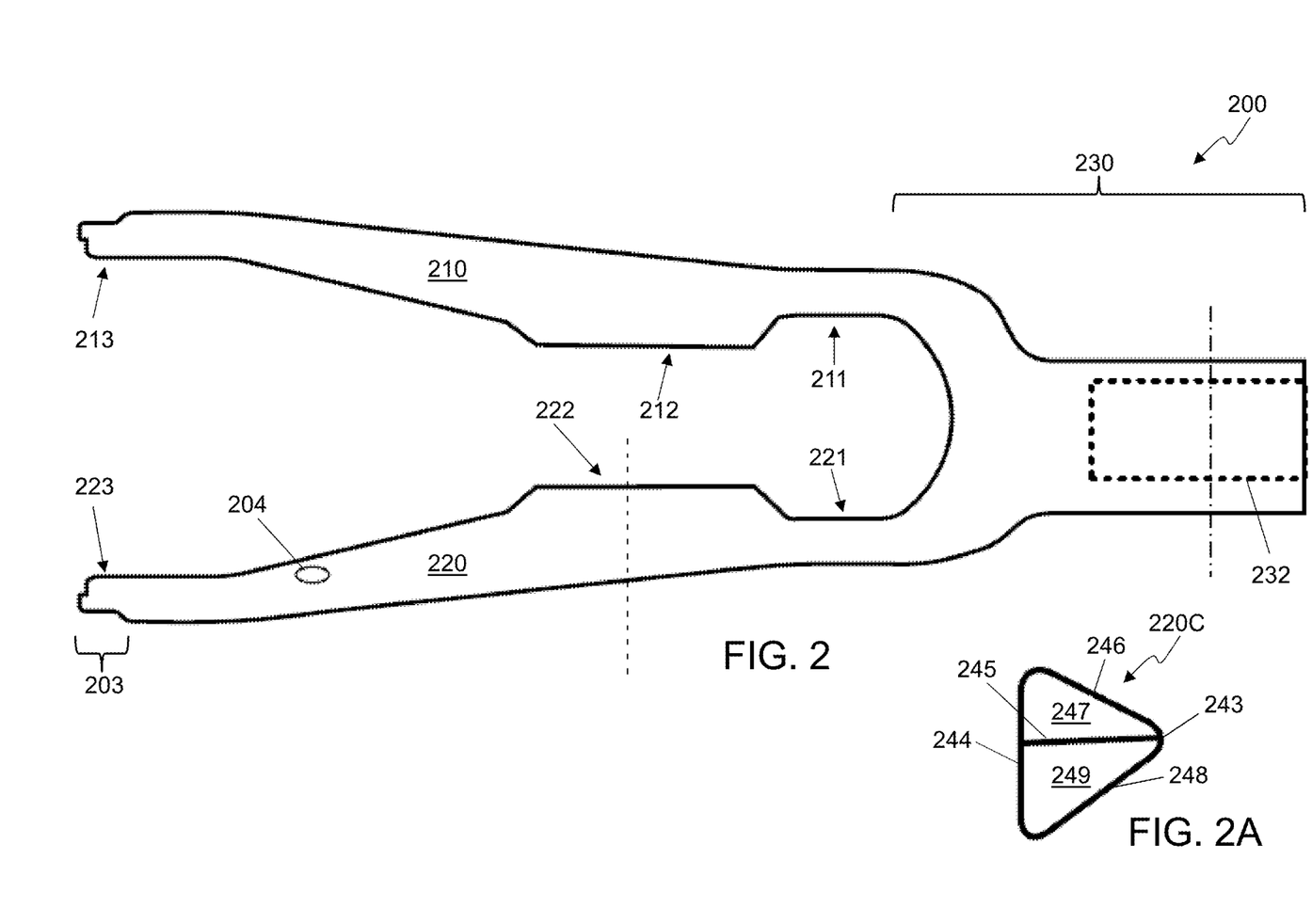
FIG. 2 a second embodiment of a vehicle component in accordance with the present disclosure.
FIG. 2A a cross-sectional view of FIG. 2 taken along the dotted line through an arm of FIG. 2.

FIG. 2 shows second embodiment of a vehicle component in accordance with the present disclosure. In the depicted embodiment, the vehicle component is a rear swingarm/fork 200 for a bicycle. The depicted fork 200 comprises two arms 210, 220 and a yoke portion 230 connecting the two arms 210, 220. The yoke portion 230 forms a barrel 232 (dotted) of a slide link. The two arms 210, 220 each include an intermediate portion 211,221 adjacent to the yoke portion 230. Each arm 210, 220 comprises a bulging region 212, 222 and an intermediate portion 211,222 intermediate the bulging region 212, 222 and the yoke portion 230. The bulging region 212, 222 of each arm protrudes in a direction of the other arm. As shown in the cross-sectional depiction 220C of FIG. 2A taken along the dotted line through the arm of FIG. 2, the arm 220 is a (generally triangular) tubular structure that is divided by an interior wall 245 that extends from an inner wall 243 to an outer wall 244. The interior wall 245 divides the arm 220 into a first tubular chamber 247 (upper triangle within the triangular arm depicted in FIG. 2A) bounded by the interior wall 245, the inner wall 243, a first side wall 246, and the outer wall 244 and a second tubular chamber 249 (lower triangle within the triangular arm depicted in FIG. 2A) bounded by the interior wall 245, the inner wall 243, a second side wall 248, and the outer wall 244. Each arm 210, 220 also has a receptacle 214, 224, or dropout, near an end opposite of the yoke portion 230 to accept an axle of a wheel. FIG. 2 also depicts an opening 204 of a cable guide between the protruding region 222 and the axle region 203 of the arm 220.

Figure 2B:
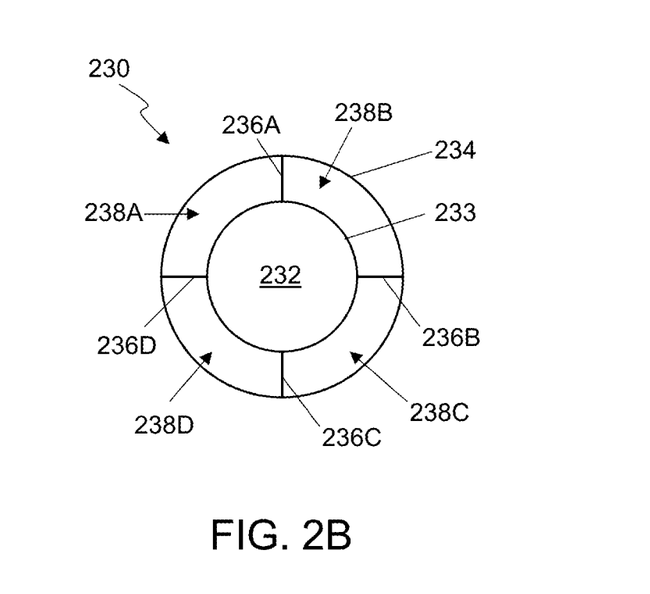
FIG. 2B a cross-sectional view of FIG. 2 taken along the dash-dot line through the yoke portion of FIG. 2.

FIG. 2B shows a cross-sectional view of the vehicle component 200 taken through the yoke portion 230 along the dash-dot line in FIG. 2. The yoke portion 230 includes an outer wall 234 and an inner wall 233 forming a barrel 232. The yoke portion 230 also includes a first interior wall 236A that extends from the outer wall 234 to the inner wall 233 forming the barrel 232 which divides the yoke portion 230 into a first tubular chamber 238A and a second tubular chamber 238B. The yoke portion 230 also includes a second interior wall 236B, a third interior wall 236C, and a fourth interior wall 236D. The four interior walls 236A-D divide the yoke portion 230 into four tubular chambers, 238A-D. Adjacent interior walls, such as the first interior wall 236A and the second interior wall 236B, are substantially orthogonal, i.e. the angle between them is substantially equal to 360° divided by the number of walls (4).

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, wherein a (respective) collection may comprise one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every combination and/or permutation that may be obtained by choosing from the set of optional features. However, the present disclosure is to be interpreted as explicitly disclosing all such combinations/permutations. For example, a system described as having three optional features may be embodied in seven different ways, namely with just one of the three possible features, with any two of the three possible features or with all three of the three possible features.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The above disclosure may be summarized as comprising the following embodiments.

Embodiment 1

A vehicle component, comprising:
a first arm;
a second arm; and
a yoke portion that connects said first arm and said second arm, wherein
at least one of said first arm, said second arm and said yoke portion comprises a tubular structure and an interior wall that divides said tubular structure into a first tubular chamber and a second tubular chamber.

Embodiment 2

The vehicle component of Embodiment 1, wherein:
an inner wall of said first arm that faces said second arm comprises a bulging region that protrudes further in a direction of said second arm than an intermediate region of said inner wall intermediate said bulging region and said yoke portion.

Embodiment 3

The vehicle component of Embodiment 2, wherein:
said bulging region protrudes at least 4 mm further in a direction of said second arm than said intermediate region.

Embodiment 4

The vehicle component of Embodiment 2 or 3, wherein:
said interior wall interconnects said inner wall and an outer wall of said first arm that faces away from said second arm.

Embodiment 5

The vehicle component of any one of Embodiments 2-4, wherein:
said interior wall interfaces said inner wall at an apex of said bulge region.

Embodiment 6

The vehicle component of any one of Embodiments 2-5, comprising:
an opening that perforates said inner wall, said opening having a diameter of no more than 12 mm.

Embodiment 7

The vehicle component of any one of Embodiments 1-6, wherein:
said first arm defines a first receptacle that receives a first end of an axle of a wheel,
said second arm defines a second receptacle that receives a second end of said axle, and
said first receptacle and said second receptacle define a plane orthogonal to an axle axis through said first receptacle and said second receptacle and midway between said first receptacle and said second receptacle.

Embodiment 8

The vehicle component of Embodiment 7, wherein:
said interior wall is orthogonal to said orthogonal plane.

Embodiment 9

The vehicle component of Embodiment 7 or 8, wherein:
said yoke portion is asymmetric relative to said orthogonal plane.

Embodiment 10

The vehicle component of any one of Embodiments 7-9, wherein:
said yoke portion comprises a cylindrical receptacle having a longitudinal axis parallel to said orthogonal plane.

Embodiment 11

The vehicle component of Embodiment 10, wherein:
said cylindrical receptacle has a circular cross-section,
said longitudinal axis extends through a center of said circular cross-section and is offset from said orthogonal plane by at least 5 mm.

Embodiment 12

The vehicle component of any one of Embodiments 1-12, wherein:
said yoke portion is a double wall structure.

Embodiment 13

A vehicle, comprising:
a tubular structure; and
an interior wall, wherein
the interior wall longitudinally divides at least a portion of the tubular structure into a first tubular chamber and s second tubular chamber,
the vehicle is selected from the group consisting of bicycle, an e-bike, a motorcycle, a moped, a (terrestrial) rover, a snowmobile, a snow scooter and a personal watercraft, and
the tubular structure constitute a portion of a frame of the vehicle.

Embodiment 14

The vehicle of Embodiment 13, wherein:
said tubular structure and said interior wall are of a material selected from the group consisting of a carbon fiber material and aluminum.

Embodiment 15

The vehicle of Embodiment 13 or 14, wherein:
said first tubular chamber has a length of at least 5 cm.

Embodiment 16

The vehicle of any one of Embodiments 13 to 15, wherein:
said tubular structure is a tubular structure selected from the group consisting of a seat tube, a top tube and a down tube of a bicycle.

The invention claimed is:

1. A vehicle component, comprising:
a first arm;
a second arm; and
a yoke portion that connects said first arm and said second arm;
said first arm comprising:
   an inner wall that faces said second arm; and
   a bulging region comprising a tubular structure;
   said bulging region protruding further in a direction of said second arm than an intermediate region of said inner wall intermediate said bulging region and said yoke portion;
   said tubular structure comprising an interior wall that divides said tubular structure into a first tubular chamber and a second tubular chamber.

2. The vehicle component of claim 1, wherein:
said interior wall extends from said inner wall to an outer wall of said first arm that faces away from said second arm.

3. The vehicle component of claim 1, wherein:
said interior wall interfaces said inner wall at an apex of said bulging region.

4. The vehicle component of claim 1, said first arm connected to said yoke portion at a first end of said first arm and further comprising a first receptacle formed to receive a first end of an axle of a wheel, said first receptacle located at or near a second end of said first arm opposite from said first end;
said second arm comprising a second receptacle formed to receive a second end of said axle; and
said bulging region having a length measured in a first direction from the first end toward the second end of said first arm and a width measured in a second direction perpendicular to the first direction and parallel to a plane of said wheel, said length being larger than said width.

5. The vehicle component of claim 1, said yoke portion comprising:
a cylindrical receptacle open at an end of said yoke portion opposite said first arm and second arm and having a cylindrical inner wall about a longitudinal axis of the receptacle; and
an outer wall;
said interior wall continuing into said yoke portion and extending radially from the cylindrical inner wall to the outer wall, wherein said first tubular chamber and said second tubular chamber continue into said yoke portion.

6. A vehicle component comprising:
a first arm comprising a tubular structure having an interior wall that divides said tubular structure into a first tubular chamber and a second tubular chamber, and a first receptacle formed to receive a first end of an axle of a wheel;
a second arm comprising a second receptacle formed to receive a second end of said axle; and
a yoke portion that connects said first arm and said second arm, said yoke portion comprising a cylindrical receptacle having a longitudinal axis centered in a cross-section of the cylindrical receptacle and parallel to a plane orthogonal to an axis of the axle through said first receptacle and said second receptacle and midway between said first receptacle and said second receptacle, wherein said longitudinal axis is offset from said orthogonal plane by at least 5 mm.

7. The vehicle component of claim 6, wherein:
said interior wall is orthogonal to said orthogonal plane.

8. The vehicle component of claim 6, said cylindrical receptacle having a circular cross-section.

9. The vehicle component of claim 6, said cylindrical receptacle open at an end of said yoke portion opposite said first arm and second arm and having a cylindrical inner wall about the longitudinal axis; and
said yoke portion comprising an outer wall;
said interior wall continuing into said yoke portion and extending radially from the cylindrical inner wall to the outer wall, wherein said first tubular chamber and said second tubular chamber continue into said yoke portion.

10. The vehicle component of claim 6, further comprising:
an opening that perforates an exterior wall of said first arm in a third of said first arm proximate said first receptacle, said opening sized to accommodate a cable guide.

11. A vehicle component comprising:
a cylindrical receptacle open at a first end of the vehicle component and having a cylindrical inner wall about a longitudinal axis of the receptacle;
an outer wall surrounding the cylindrical inner wall;
a first interior wall, a second interior wall, a third interior wall, and a fourth interior wall, each substantially parallel to the longitudinal axis of the receptacle and extending radially from the cylindrical inner wall to the outer wall to create a first chamber, a second chamber, a third chamber, and a fourth chamber;
wherein the first interior wall is substantially orthogonal to both the second interior wall and the fourth interior wall, and the third interior wall is substantially orthogonal to the second interior wall;
the first chamber and the second chamber are separated by the first interior wall; and
the third chamber and the fourth chamber are separated by the third interior wall.

12. The vehicle component of claim 11, further comprising:
a yoke portion that includes the cylindrical receptacle;
a first fork arm comprising a first tubular structure extending from a second end of the yoke portion opposite the first end of the vehicle component, the first interior wall extending into the first fork arm to divide the first tubular structure into at least two chambers;
a second fork arm comprising a second tubular structure extending from the second end of the yoke portion, the third interior wall extending into the second fork arm to divide the second tubular structure into at least two chambers;
a first receptacle at an end of the first fork arm opposite the yoke portion and formed to receive a first end of an axle of a wheel; and a second receptacle at an end of the second fork arm opposite the yoke portion and formed to receive a second end of the axle;

wherein the first fork arm and the second fork arm are arranged to accommodate an upper portion of the wheel between the first fork arm and the second fork arm.

13. The vehicle component of claim 12, the first chamber and the second chamber continuing into the first tubular structure to form the at least two chambers of the first tubular structure of the first fork arm, and the third chamber and the fourth chamber continuing into the second tubular structure to form the at least two chambers of the second tubular structure of the second fork arm.

14. The vehicle component of claim 12, the longitudinal axis centered in a cross-section of the cylindrical receptacle and parallel to a plane orthogonal to an axis of the axle through the first receptacle and the second receptacle and midway between the first receptacle and the second receptacle;

wherein said longitudinal axis is offset from said orthogonal plane by at least 5 mm.

15. The vehicle component of claim 12, the longitudinal axis centered in a cross-section of the cylindrical receptacle and located on a plane orthogonal to an axis of the axle through the first receptacle and the second receptacle and midway between the first receptacle and the second receptacle.

16. The vehicle component of claim 11, further comprising:

a yoke portion that includes the cylindrical receptacle; and an arm comprising a tubular structure extending from an end of the yoke portion opposite the first end of the vehicle component, the arm including a fifth interior wall to divide the tubular structure into a fifth chamber and a sixth chamber.

17. The vehicle component of claim 16, wherein the fifth interior wall is an extension of the first interior wall;

the fifth chamber is an extension of the first chamber; and the sixth chamber is an extension of the second chamber.

18. The vehicle component of claim 16, said tubular structure further comprising a bulging region and an intermediate region intermediate the bulging region and the yoke portion;

the bulging region having a cross-sectional area larger than a cross-sectional area of the intermediate region;

wherein the cross-sectional area of the bulging region and the cross-sectional area of the intermediate region are measured on planes orthogonal to the longitudinal axis of the receptacle.

19. The vehicle component of claim 16, further comprising:

an opening that perforates an exterior wall of the arm in a third of the arm opposite of the yoke portion, the opening sized to accommodate a cable guide.

* * * * *